US009303650B2

(12) United States Patent
Ulrey et al.

(10) Patent No.: US 9,303,650 B2
(45) Date of Patent: Apr. 5, 2016

(54) INTRODUCTION OF EXHAUST GAS RECIRCULATION AT A COMPRESSOR BLADE TRAILING EDGE

(71) Applicant: Ford Global Technologies, LLC, Dearborn, MI (US)

(72) Inventors: Joseph Norman Ulrey, Dearborn, MI (US); Keith Michael Plagens, Northville, MI (US); Gregory Patrick McConville, Ann Arbor, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 13/925,591

(22) Filed: Jun. 24, 2013

(65) Prior Publication Data

US 2014/0377059 A1   Dec. 25, 2014

(51) Int. Cl.

| | |
|---|---|
| *F02B 37/00* | (2006.01) |
| *F02B 33/44* | (2006.01) |
| *F02M 25/07* | (2006.01) |
| *F04D 17/10* | (2006.01) |
| *F02C 6/12* | (2006.01) |
| *F01D 9/02* | (2006.01) |
| *F02C 3/34* | (2006.01) |
| *F02B 37/18* | (2006.01) |
| *F02B 37/12* | (2006.01) |

(52) U.S. Cl.
CPC ............... *F04D 17/10* (2013.01); *F01D 9/026* (2013.01); *F02B 37/00* (2013.01); *F02B 37/127* (2013.01); *F02B 37/18* (2013.01); *F02C 3/34* (2013.01); *F02C 6/12* (2013.01); *F02M 25/07* (2013.01); *F05D 2220/40* (2013.01); *Y02T 10/121* (2013.01); *Y02T 10/144* (2013.01)

(58) Field of Classification Search
CPC ........ F02B 37/00; F02B 37/18; F02B 37/127; F02C 3/34; F02C 6/12; F02M 25/07; F01D 9/026; F04D 17/10; F05D 2220/40; Y02T 10/121; Y02T 10/144
USPC .................. 60/605.1, 605.2; 123/568.17; 415/203–205
See application file for complete search history.

(56) References Cited

U.S. PATENT DOCUMENTS

| | | | | |
|---|---|---|---|---|
| 4,250,711 | A | * | 2/1981 | Zehnder ................... 60/605.2 |
| 5,327,725 | A | * | 7/1994 | Mitsubori ................. 60/605.2 |
| 5,406,796 | A | * | 4/1995 | Hiereth et al. ........... 60/605.2 |

(Continued)

FOREIGN PATENT DOCUMENTS

JP        2012149588 A  *  8/2012

OTHER PUBLICATIONS

"Inboard," Def. 3, YourDictionary, Retrieved Jun. 18, 2015 from http://www.yourdictionary.com/inboard.*

*Primary Examiner* — Audrey K Bradley
(74) *Attorney, Agent, or Firm* — Julia Voutyras; Alleman Hall McCoy Russell & Tuttle LLP (57) ABSTRACT

Methods and systems are provided for injecting exhaust gases from an exhaust gas recirculation system proximate to a trailing edge of a compressor wheel of a compressor. In one example, a compressor of a turbocharger may include an exhaust gas recirculation inlet volute within a casting of the compressor. The exhaust gas recirculation inlet volute may include an injection port positioned downstream of the trailing edge of the compressor wheel for injecting exhaust gases into intake air flow.

17 Claims, 4 Drawing Sheets

(56) References Cited

U.S. PATENT DOCUMENTS

| | | | |
|---|---|---|---|
| 5,937,650 A * | 8/1999 | Arnold | 60/605.2 |
| 6,145,313 A * | 11/2000 | Arnold | 60/605.2 |
| 6,301,889 B1 * | 10/2001 | Gladden et al. | 60/605.2 |
| 7,624,575 B2 | 12/2009 | Noelle et al. | |
| 7,721,542 B2 | 5/2010 | Chen | |
| 2005/0188693 A1 * | 9/2005 | Schmid et al. | 60/599 |
| 2007/0144170 A1 * | 6/2007 | Griffith | 60/600 |
| 2008/0000230 A1 * | 1/2008 | Strauser | 60/605.2 |
| 2011/0048003 A1 | 3/2011 | Chen | |

\* cited by examiner

INTRODUCTION OF EXHAUST GAS RECIRCULATION AT A COMPRESSOR BLADE TRAILING EDGE

BACKGROUND/SUMMARY

Engines may utilize a turbocharger or supercharger to compress ambient air entering the engine in order to increase power. Further, engines may recirculate a portion of exhaust gas from an exhaust passage to an intake passage, referred to herein as exhaust gas recirculation (EGR). In low pressure (LP) EGR, exhaust gas is routed from downstream of a turbine of the turbocharger to upstream of a compressor of the turbocharger. LP EGR may result in water condensation before the compressor, thereby increasing a risk of compressor wheel damage. In high pressure (HP) EGR, exhaust gas is routed from upstream of the turbine to downstream of the compressor. HP EGR may reduce condensation at the compressor; however, HP EGR may have flow limitations when boost pressure is higher than turbine backpressure. Other attempts to address the HP EGR and LP EGR system limitations discussed above may include a dual EGR system utilizing both HP and LP EGR systems. However, dual EGR systems may be costly.

In one example, the issues described above may be addressed by a system for introducing exhaust gases from an exhaust gas recirculation (EGR) system and to a compressor, downstream of a compressor blade. Specifically, a compressor of a turbocharger may include a compressor wheel rotatable about a central axis of the compressor and an EGR inlet volute. The compressor may further include a volute positioned within a casting of the compressor, the volute including a diffuser. The EGR inlet volute may include an injection port coupled to the diffuser at a position proximate to a trailing edge of the compressor wheel. Thus, exhaust gases from the EGR inlet volute may mix with intake air within the diffuser, downstream of the compressor wheel. Air flow velocities within this upstream region of the diffuser may be relatively high while air pressures may be lower than further downstream in the diffuser and volute. Introducing EGR in this way may reduce the EGR flow limitations of traditional HP EGR systems while also increasing durability of the compressor wheel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
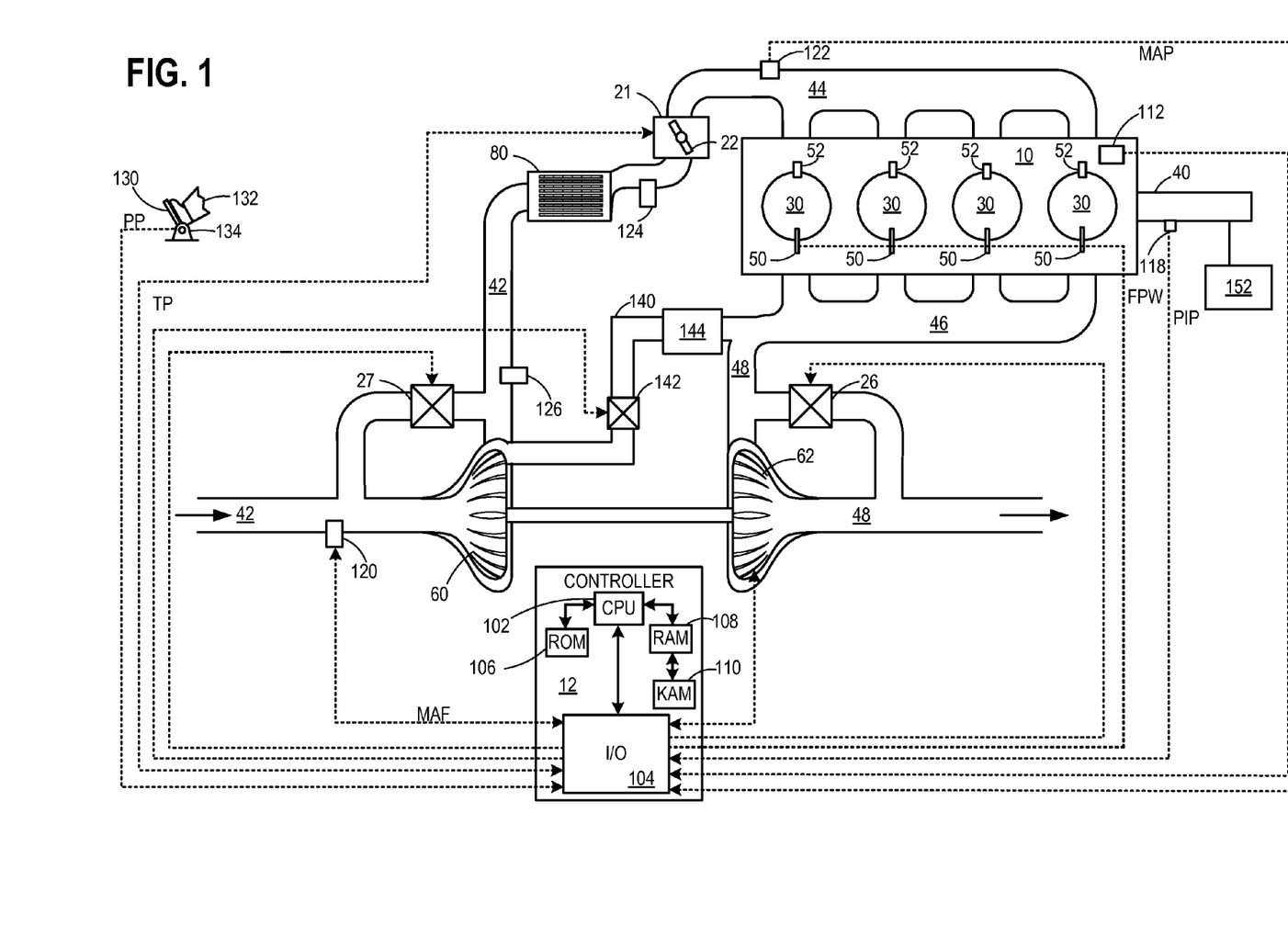
FIG. 1 is a schematic diagram of an example engine system including an exhaust gas recirculation system.
Figure 2:
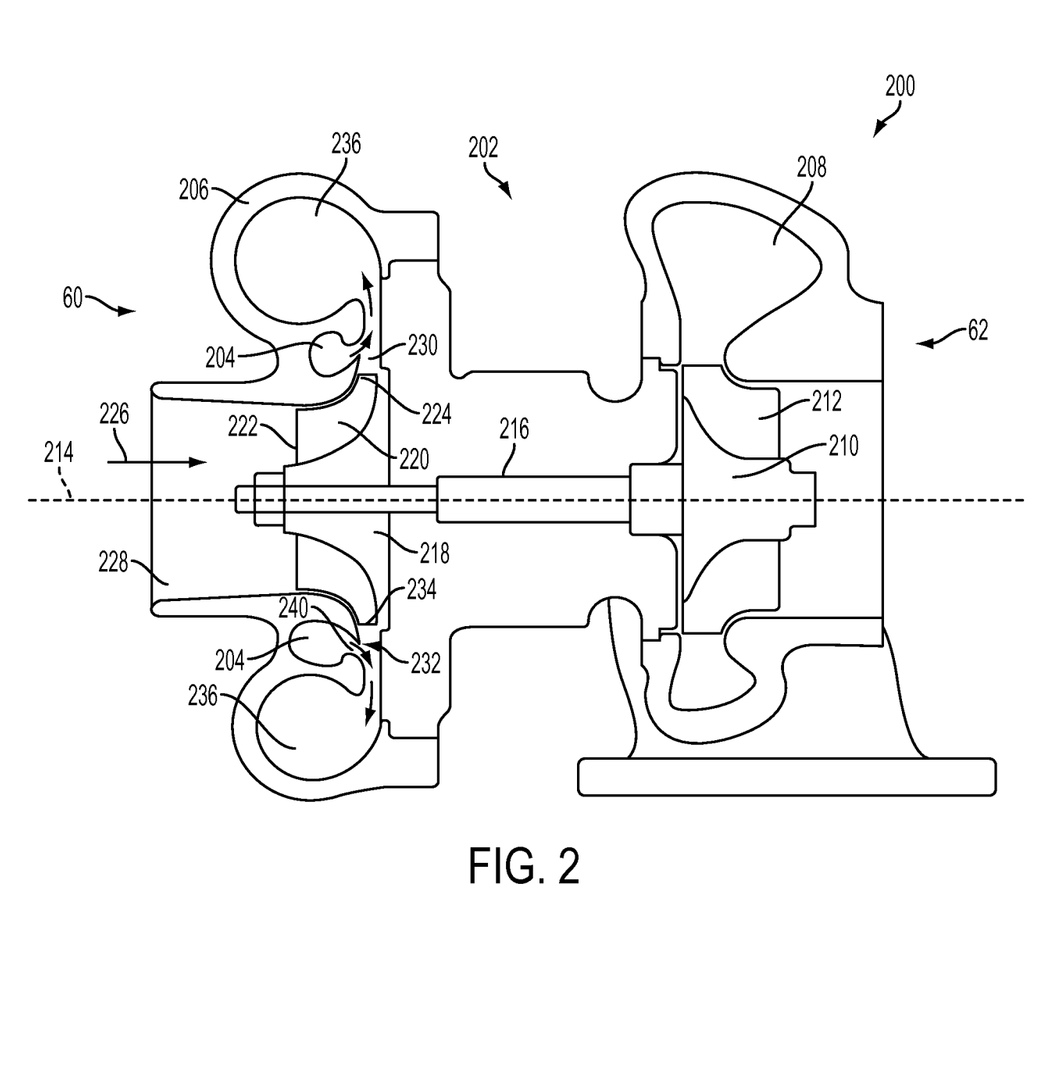
FIG. 2 is a schematic of a cross-sectional view of a first embodiment of a compressor having an EGR inlet volute.
Figure 3:
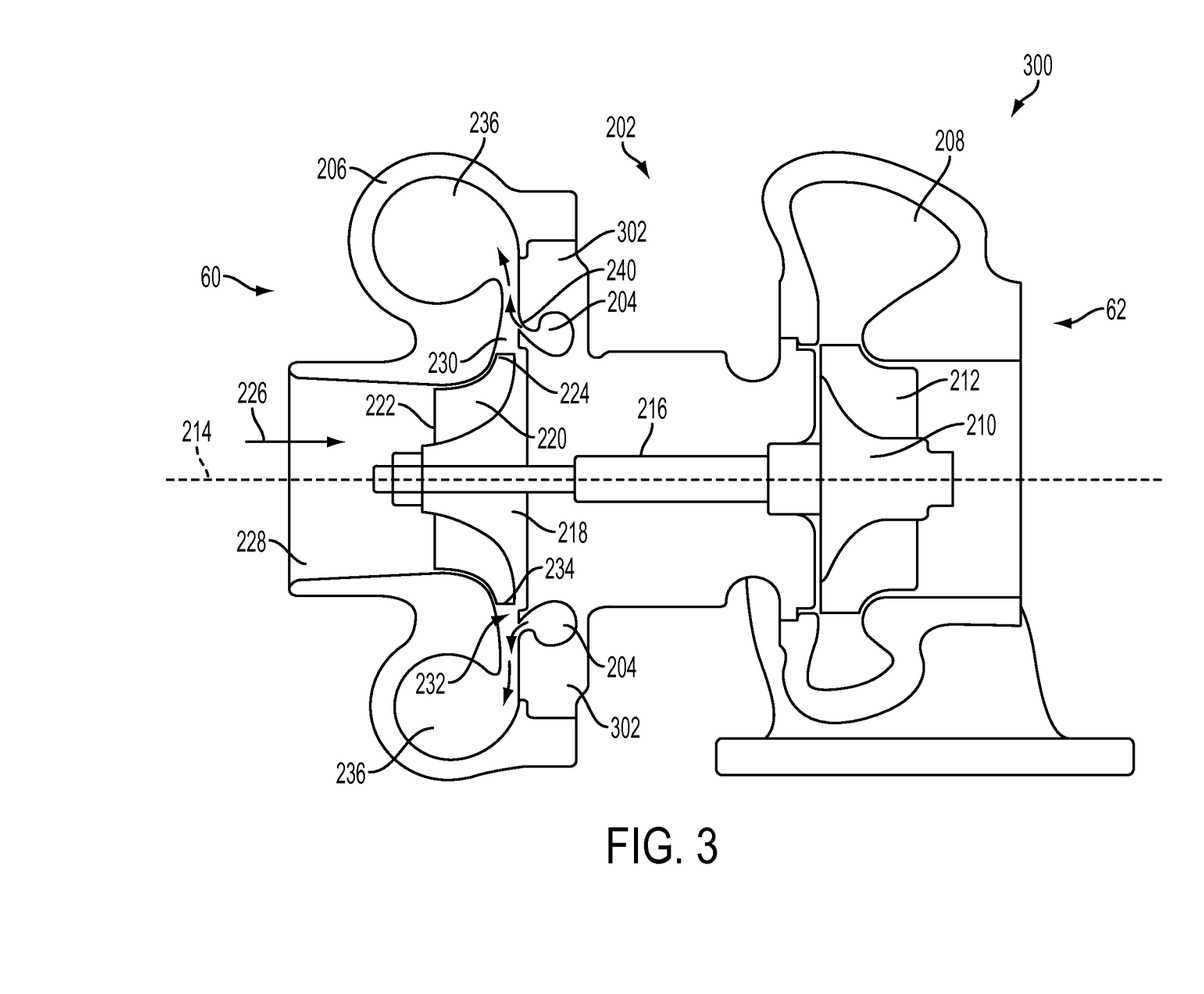
FIG. 3 is a schematic of a cross-sectional view of a second embodiment of a compressor having an EGR inlet volute.
Figure 4:
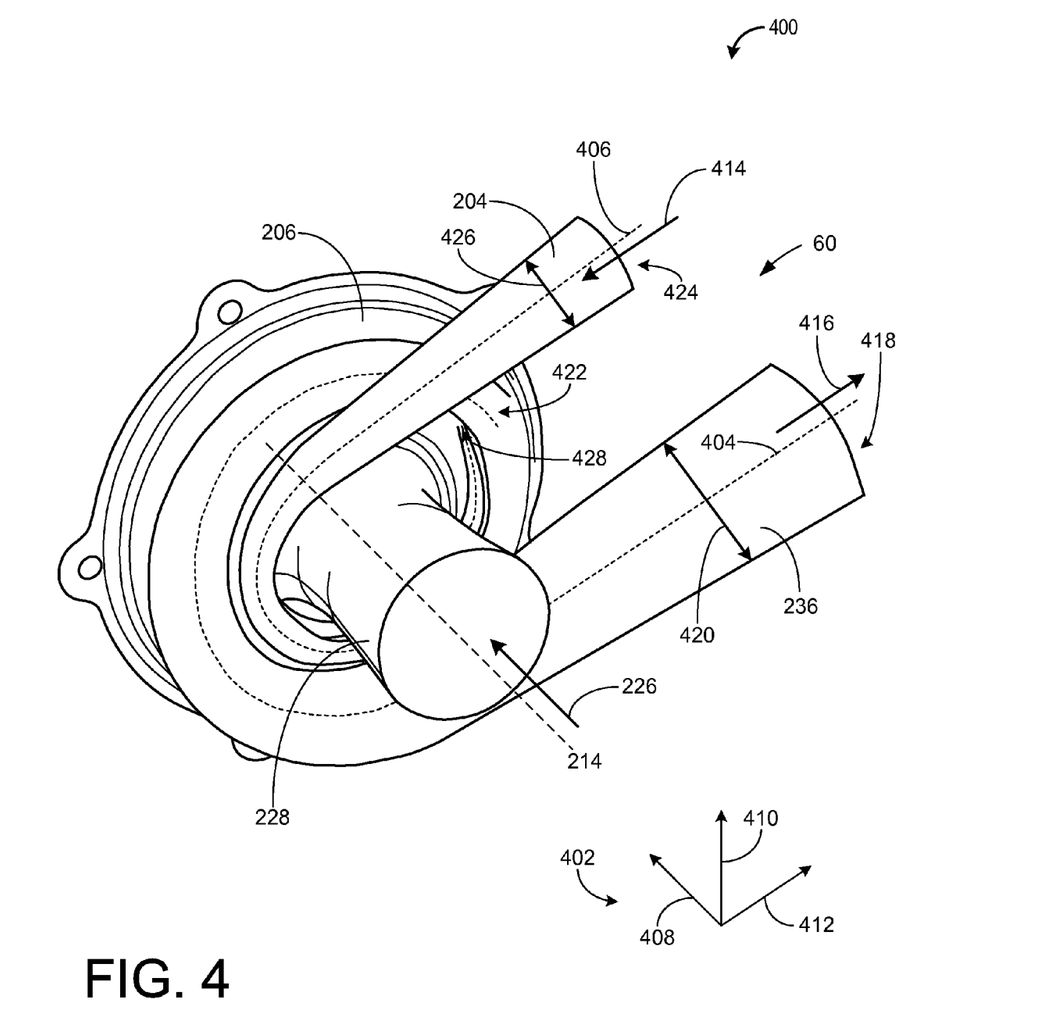
FIG. 4 is a schematic of an isometric view of a compressor having an EGR inlet volute.

The following description relates to systems for introducing (e.g., injecting) exhaust gases from an exhaust gas recirculation system downstream of a compressor wheel. As shown in FIG. 1, an exhaust gas recirculation (EGR) passage may be coupled between an exhaust passage and a compressor. Specifically, the compressor may include an EGR inlet volute in a casting of the compressor. In an alternate embodiment, as shown at FIG. 3, the EGR inlet volute may be incorporated into a backplate of the compressor instead of the casting. FIG. 4 shows a schematic of the compressor with the EGR inlet volute in addition to a compressor volute. The EGR inlet volute may inject exhaust gases from the EGR passage into a diffuser of the compressor, proximate to a trailing edge of a compressor blade of the compressor wheel. FIGS. 2-3 show two embodiments of the inlet EGR passage positioned within the compressor. Injecting the EGR exhaust gases downstream of the compressor wheel may reduce compressor wheel damage from condensation, thereby increasing durability of the compressor wheel. Additionally, air flow velocities may be higher while air pressures may be lower in the diffuser, near the trailing edge of the compressor blade, compared to locations further downstream in the compressor. Thus, EGR air flow limitations due to higher pressures may be reduced.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle and use engine output torque to propel the automobile. The crankshaft 40 may also be used to drive an alternator 152.

The combustion chambers 30 may receive intake air from the intake manifold 44 and may exhaust combustion gases via an exhaust manifold 46 to an exhaust passage 48 (also referred to herein as the exhaust). The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in.

The intake manifold 44 may receive intake air from an intake passage 42. The intake passage 42 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CRV 27 to decrease pressure at the outlet of the compressor 60. This may reduce or stop compressor surge. In some embodiments, the CRV 27 may be two position valve adjustable between a closed and an open position. In other embodiments, the CRV 27 may be a multiple position valve adjustable into a plurality of positions between fully opened and fully closed. As such, the CRV 27 may be adjusted to vary flow around the compressor 60.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air.

Further, in the disclosed embodiments, an exhaust gas recirculation (EGR) system may route a desired portion of exhaust gas from the exhaust passage 48 to the intake passage 42 via an EGR passage, such as EGR passage 140. The amount of EGR provided to the intake passage 42 may be varied by the controller 12 via an EGR valve, such as EGR valve 142. Under some conditions, the EGR system may be used to regulate the temperature of the air and fuel mixture within the combustion chamber. The EGR passage 140 may further include an EGR cooler 144 for cooling exhaust gases traveling through the EGR passage 140. The EGR passage 140 routes EGR from upstream of the turbine 62 and directly to the compressor 60. Specifically, the EGR passage 140 is coupled to the compressor 60 through a volute (e.g., EGR inlet volute) and introduces EGR downstream of a wheel of the compressor 60. FIGS. 2-4, described further below, show in detail how the EGR is introduced into the compressor 60.

As shown in FIG. 1, the EGR system is similar to a traditional high pressure (HP) EGR system which routes EGR from upstream of a turbine to downstream of a compressor. However, as discussed further below with reference to FIGS. 2-4, the EGR passage 140 injects EGR into the compressor 60, proximate to a trailing edge of a blade (of a compressor wheel) of the compressor 60. This area may be at a lower pressure than further downstream from the compressor 60. As a result, the flow limitations of traditional HP EGR systems when the intake manifold pressure (or boost pressure) is greater than turbine backpressure may be reduced. Further, in the configuration shown in FIG. 1, mixing of the EGR and intake air may be greater than in traditional HP EGR systems.

In some embodiments, the engine 10 may also include a low pressure (LP) EGR system (not shown) where EGR is routed from downstream of the turbine 62 to upstream of the compressor 60. In the embodiment shown in FIG. 1, the EGR system may provide advantages over traditional LP EGR systems. For example, since EGR is injected after the compressor wheel, condensation in the EGR flow may not impact the compressor wheel, thereby reducing corrosion and increasing durability of the compressor blade and wheel. Further, injecting EGR into the intake system downstream of the compressor wheel may increase compressor efficiency compared to traditional LP EGR. In the configuration shown in FIG. 1, the compressor 60 is compressing cooler air (e.g., only compressing intake air and not EGR) since EGR does not mix with the intake air until after the compressor blade of the compressor wheel. As a result, the compressor blade may remain at a lower temperature than if EGR was injected into the intake passage 42 upstream of the compressor 60. Keeping the compressor blade at a lower temperature may increase blade durability and compressor efficiency, while also reducing oil coking.

The EGR system shown in FIG. 1 and described further below with reference to FIGS. 2-4, may also decrease total engine system costs. For example, the size of the EGR cooler 144 may be reduced since the CAC 80 may aid in cooling higher pressure EGR gases (traditional HP EGR systems inject EGR downstream of the CAC, thereby requiring increased cooling from the EGR cooler). Further, the EGR system shown in FIG. 1 may not have a pre-compressor low pressure throttle as used in traditional LP EGR systems. Further illustration of the advantages of the EGR configuration shown in FIG. 1 are discussed further below with regard to FIGS. 2-4.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature and/or pressure sensor 124 at an outlet of a charge air cooler 80, and a boost pressure sensor 126. Other sensors not depicted may also be present, such as a sensor for determining the intake air velocity at the inlet of the charge air cooler, a sensor for determining intake air humidity, and other sensors.

FIGS. 2-4 show schematics of a compressor 60 including an EGR inlet volute 204 for introducing (e.g., injecting) EGR after a blade (e.g., wheel) of the compressor. FIGS. 2-3 are cross-sectional views of a turbocharger 202 including a compressor 60 and turbine 62, as introduced in FIG. 1. FIG. 4 shows an isometric view of the compressor 60 with the EGR inlet volute 204.

Turning first to FIG. 2, a schematic 200 of a first embodiment of the turbocharger 202 is shown. Specifically, schematic 200 shows the EGR inlet volute 204 positioned within a casting 206, or housing, of the compressor 60. As introduced above, exhaust gases from combustion enter the turbine 62 at one or more scrolls 208. Exhaust gases travel through the scrolls 208 which wrap around the turbine 62. The scrolls 208 are in fluid communication with a turbine wheel 210. As such, flow of the exhaust gases through the scrolls 208 may interact with a turbine blade 212 of the turbine wheel 210, thereby causing the turbine wheel 210 to rotate about a rotational axis 214 of the turbocharger 202. The turbine wheel 210 is coupled to a first end of a shaft 216. The shaft 216 is further coupled at a second end of the shaft 216 to a compressor wheel 218. As such, rotational motion of the turbine wheel 210 rotates the shaft 216, thereby rotating the compressor wheel 218 about the rotational axis 214. In this way, the rotational axis 214 of the turbocharger 202 is also the rotational axis 214 of the compressor wheel 218 and the turbine wheel 210. Further, the rotational axis 214 may also be referred to as a central axis of the turbocharger 202, the compressor 60, and/or the turbine 62.

The compressor wheel 218 includes a compressor blade 220 with a plurality of vanes around a circumference of the compressor wheel 218. FIG. 2 shows a cross-section of compressor blade 220. The compressor blade 220 has an inducer end 222 and an exducer end 224. Intake air 226 enters the compressor 60 at an inlet conduit 228 of the compressor 60. The inlet conduit 228 may be coupled to an intake passage, such as intake passage 42 shown in FIG. 1. Intake air 226 enters the compressor 60 at the compressor blade 220 of the compressor wheel 218. Specifically, as the compressor wheel spins around the rotational axis 214, intake air 226 enters the compressor blade 220 at the inducer end 222. Intake air 226 is then forced out of the exducer end 224 of the compressor blade 220 by the centrifugal force of the rotating compressor wheel 218. As a result, intake air 226 enters a diffuser 230 of the compressor 60 at a higher velocity than when it entered the inlet conduit 228. The region of the diffuser 230 near a trailing edge 234 (e.g., proximate to the trailing edge) of the compressor blade 220, shown at arrow 232, may be a region of relatively low pressure and relatively high air flow velocity. For example, air flow velocities in the diffuser at arrow 232 may be higher than air flow velocities further downstream in the compressor 60. Further, the trailing edge 234 of the compressor blade 220 may be an outermost edge of the compressor blade 220 and the compressor wheel 218.

Air flows downstream through the diffuser 230 and into a volute 236 of the compressor 60. The volute 236 of the compressor 60 may be an intake volute. Thus, the diffuser 230 may be coupled to and included as part of the volute 236. As such, the diffuser 230 may extend between the trailing edge 234 of the compressor blade 220 and the volute 236. Air may flow through the diffuser 230, radially outward from the rotational axis 214, and into the volute 236. FIG. 4, described further below, shows an isometric view of the compressor 60 with the volute 236 wrapping around an outer circumference of the casting 206 of the compressor 60. After air passes through the volute 236, it exits the compressor 60 at an outlet (shown in FIG. 4), the outlet coupled to the intake passage, and then continues downstream to a CAC (such as CAC 80 shown in FIG. 1) and/or an intake manifold (such as intake manifold 44 shown in FIG. 1).

As introduced above at FIG. 1, EGR from an EGR system may be injected downstream of the compressor blade 220. As shown in FIG. 2, EGR may pass through the EGR inlet volute 204 positioned within the casting 206 of the compressor 60. The EGR inlet volute may also be an intake volute of the compressor. The EGR inlet volute 204 is positioned radially between the volute 236 and the compressor wheel 218. As shown in FIG. 4 and discussed further below, the EGR inlet volute 204 wraps around the compressor, between the volute 236 and the inlet conduit 228. As such, the EGR inlet volute 204 may form a ring around at least a portion of the inlet conduit 228 and the compressor wheel 218, with the casting 206. The volute 236 may also form a ring around at least a portion of the inlet conduit 228 and the compressor wheel 218, within the casting 206. As seen in FIG. 2, a ring radius of the EGR inlet volute 204, the ring radius of the EGR inlet volute 204 defined between the rotational axis 214 and the EGR inlet volute 204, is inside of and smaller than a ring radius of the volute 236, the ring radius of the volute 236 defined between the rotational axis 214 and the volute 236.

As shown in FIG. 2, a diameter (e.g., passage diameter) of the volute 236 and a diameter (e.g., passage diameter) of the EGR inlet volute 204 changes around the circumference of the compressor 60. Specifically, the diameter of the volute 236 increases as the air moves further downstream in the volute 236 and approaches an outlet of the volute 236 and the compressor 60. The diameter of the EGR inlet volute 204 decreases from an inlet of the EGR inlet volute 204 to further downstream in the EGR inlet volute 204. These diameters are depicted in FIG. 4, discussed further below.

Exhaust gases may pass from the EGR inlet volute 204 and into the diffuser 230 proximate to the region of the diffuser closest to the trailing edge 234 of the compressor blade 220, as shown at arrow 232. Specifically, the EGR inlet volute 204 may include an injection port 240, the injection port 240 coupled to the diffuser 230 downstream of the compressor blade 220 but upstream of an end of the diffuser 230 proximate to the volute 236. Said another way, the injection port 240 is coupled to the diffuser 230 at a position along the diffuser 230 closer to the trailing edge 234 of the compressor blade 220 than the volute 236. Further, the injection port 240 curves towards the diffuser in a direction of the air flow. As shown in FIG. 2, the injection port 240 curves outward from a main passageway of the EGR inlet volute 204, in a direction relative to the rotational axis 214 (e.g., central axis of the compressor 60). Further, the injection port 240 may be a curved slot between the main passageway of the EGR inlet volute 204 to the diffuser 230, the curved slot extending around a circumference of the compressor wheel. Intake air and exhaust gases from the EGR flow may mix in the diffuser 230 and enter the volute 236 where they may mix further. The combined gases may travel through the volute 236 and then exit the compressor 60. In one example, the curved slot of the injection port 240 may be shaped such that intake airflow from the compressor wheel may entrain the entering EGR flow, while EGR is flowing, without significantly reducing airflow velocity.

FIG. 3 shows a schematic 300 of a second embodiment of the turbocharger 202. Specifically, schematic 300 shows the EGR inlet volute 204 positioned within a backplate 302 of the compressor 60 instead of in the casting 206. The schematic 300 includes the same components as discussed above with reference to FIG. 2. Further, the air flow through the components of the compressor is the same as discussed above for FIG. 2. However, the EGR inlet volute 204 is now positioned on an opposite side of the diffuser 230 from the volute 236. In this embodiment, the EGR inlet volute 204 may wind around a circumference of the backplate 302. In other embodiments, a main body of the EGR inlet volute 204 may be positioned outside of and adjacent to the backplate 302. In this embodiment, the injection port 240 of the EGR inlet volute 204 may pass through the backplate 302 to reach the diffuser 230.

FIG. 4 shows a schematic 400 of an isometric view of the compressor 60 with the EGR inlet volute 204. FIG. 4 includes a coordinate axis 402 having a horizontal axis 408, a vertical axis 410, and a lateral axis 412. The inlet conduit 228 of the compressor is a cylindrical tube which may be coupled to the intake passage (such as intake passage 42 shown in FIG. 1) of the engine. Further, the inlet conduit 228 is centered along the rotational axis 214. As discussed above, the rotational axis 214 is also the central axis of the compressor 60. The inlet conduit 228 is parallel with the horizontal axis 408. Intake air 226 flows into the compressor 60 through the inlet conduit 228, in a direction of the horizontal axis 408.

As discussed above, the compressor 60 includes a compressor housing, or casting 206. The casting 206 includes a volute 236 and an EGR inlet volute 204. The volute 236 may also be referred to herein as an intake air volute. Both the volute 236 and the EGR inlet volute may be intake volutes positioned within the compressor housing in the intake passage of the engine. Exhaust gases 414 from an EGR passage (such as EGR passage 140 shown in FIG. 1) enter the compressor 60 through the EGR inlet volute 204. The EGR inlet volute 204 does not include a valve inside the EGR inlet volute. Instead, the EGR passage may include an EGR valve positioned upstream of the EGR inlet volute 204. As shown in FIGS. 2-3, the EGR inlet volute 204 injects the EGR exhaust gases 414 into the diffuser 230, downstream of the compressor wheel. Therein, the EGR exhaust gases 414 join and mix with the intake air 226 being expelled from the compressor wheel. Specifically, the EGR exhaust gases 414 join the intake air stream downstream of the compressor wheel, proximate to the trailing edge of the compressor blade (not shown in FIG. 4). The mixed EGR exhaust gases 414 and intake air 226 then enter the volute 236. The combined gases 416 travel through the volute 236 and exit the compressor 60 at an outlet 418 of the volute 236. The outlet 418 may be coupled to the intake passage (such as intake passage 42). Thus, the combined gases (e.g., charge air) exiting the volute 236 may continue to flow along the intake passage to downstream engine components such as a charge air cooler and an intake manifold.

Both the volute 236 and the EGR inlet volute 204 are circular passages within the casting 206. The circular passages are curved and have a diameter (e.g., passage diameter) and cross-section area which change along a length of each passage. For example, the volute 236 has a central axis 404, the central axis 404 centered within the circular passage of the volute 236. The central axis 404 of the volute 236 has a curvature as it wraps around the compressor 60. The curvature of the central axis 404 may follow an outer circumference of the compressor 60. Further, the volute 236 curves around the inlet conduit 228. Near the outlet 418 of the volute 236, the central axis 404 is parallel with the lateral axis 412. Additionally, the central axis 404 of the volute 236 is perpendicular to the rotational axis 214 and the inlet conduit 228. A diameter 420 of the volute 236 increases from a first end 422, the first end 422 incorporated into the casting 206 of the compressor, to a second end (e.g., outlet end) at the outlet 418 of the volute 236.

The combined air flow traveling through the volute 236 flows along a curved flow path defined by the curved central axis 404. The volute 236 directs the air flow circumferentially around the compressor 60, along the curved flow path. As the diameter 420 of the volute 236 increases as the curved flow path continues downstream to the outlet 418, a velocity of the air flow in the volute 236 may decrease.

Similarly, the EGR inlet volute 204 has a central axis 406 centered within the circular passage of the EGR inlet volute 204. The central axis 406 has a curvature as it wraps around the compressor 60. The curvature of the central axis 406 may follow the curvature of the central axis 404, thereby curving around the central axis (e.g., rotational axis 214) of the compressor 60. The EGR inlet volute 204 curves around the inlet conduit 228, along an inside edge of the volute 236. Specifically, the EGR inlet volute 204 is nested between the volute 236 and the inlet conduit 228 within the casting 206. A curvature radius of the central axis 406 of the EGR inlet volute 204 is smaller than a curvature radius of the central axis 404 of the volute 236, the curvature radii defined with respect to the rotational axis 214 (e.g., central axis of the compressor 60). Said another way the volute 236 curves around the inlet conduit 228 with a greater radius of curvature (e.g., curvature radius) than the EGR inlet conduit 204, the radius of curvature of the volute 236 defined between the central axis of the compressor and the central axis 404 of the volute 236. Similarly, the radius of curvature of the EGR inlet volute 204 may be defined between the central axis of the compressor (e.g., the rotational axis 214) and the central axis 406 of the EGR inlet volute 204.

Near an inlet 424 of the EGR inlet volute 204, the central axis 406 is parallel with the lateral axis 412. The central axis 406 of the EGR inlet volute 204 is perpendicular to the rotational axis 214. Further, as shown in FIG. 4, the central axis 406 of the EGR inlet volute 204 may be parallel to the central axis 404 of the volute 236, at the inlet end of the EGR inlet volute 204 and the outlet end of the volute 236. In an alternate example, the inlet 424 of the EGR inlet volute 204 may be positioned at a different location around the circumference of the compressor 60. As such, the central axis 406 may not be parallel to the central axis 404.

A diameter 426 of the EGR inlet volute 204 decreases from a first end (e.g., inlet end) at the inlet 424 of the EGR inlet volute 204 to a second end 428, the second end 428 incorporated into the casting 206 of the compressor. As shown in FIG. 4, the diameter 426 at the inlet 424 of the EGR inlet volute 204 may be smaller than the diameter 420 at the outlet 418 of the volute 236. However, in alternate embodiments, the diameter 426 at the inlet 424 may be substantially the same as the diameter 420 at the outlet 418. In yet another embodiment, the diameter 426 at the inlet 424 may be larger than the diameter 420 at the outlet 418. Further, as shown in FIG. 4, the volute 236 and the EGR inlet volute 204 have oppositely increasing cross-sectional areas (and diameters) in one direction around the central axis of the compressor. For example, the cross-sectional area and diameter 426 of the EGR inlet volute 204 increase as the EGR inlet volute 204 curves clockwise around the rotational axis 214 (wherein the clockwise direction is defined looking into the compressor from the inlet conduit). Conversely, the cross-sectional area and diameter 420 of the volute 236 increase as the volute 236 curves counter-clockwise around the rotational axis 214 (wherein the counter-clockwise direction is defined looking into the compressor from the inlet conduit).

The air flow traveling through the EGR inlet volute 204 flows along a curved flow path defined by the curved central axis 406. The EGR inlet volute 204 directs the air flow circumferentially around the inlet conduit 228 of the compressor 60, along the curved flow path. As the diameter 426 of the EGR inlet volute 204 decreases as the curved flow path continues downstream to the second end 428, a velocity of the air flow in the EGR inlet volute 204 may increase.

The system of FIGS. 1-4 provide for an engine system including an engine with an intake passage and an exhaust passage, a compressor positioned in the intake passage, the compressor having an exhaust gas recirculation inlet volute, a turbine positioned in the exhaust passage, the turbine driving the compressor, and an exhaust gas recirculation system having an exhaust gas recirculation passage, the exhaust gas recirculation passage coupled between the exhaust passage, upstream of the turbine, and the exhaust gas recirculation inlet volute of the compressor. The compressor may further include a volute having a diffuser. Additionally, the exhaust gas recirculation volute may include an injection port coupled to the diffuser proximate to a trailing edge of a compressor blade of the compressor.

As discussed above, connecting the EGR passage to the intake passage at the compressor may provide advantages over traditional LP EGR and HP EGR systems. As shown in FIGS. 1-4, EGR is injected into the compressor downstream of the compressor wheel, proximate to a trailing edge of the compressor blade. Though this location is downstream of the compressor wheel and blade, it may also be a relatively lower pressure location than further downstream in the diffuser and volute.

For example, the pressure in the volute may be higher than the pressure in the diffuser, near the trailing edge of the compressor blade. Further, the location in the diffuser proximate to the trailing edge of the compressor blade may experience higher air flow velocities than further downstream in the compressor. As the combined EGR and intake gases travel further downstream, the velocity of the air flow may decrease and pressure of the gases may increase. Injecting the EGR exhaust gas stream proximate to the trailing edge of the compressor blade has several advantages. Firstly, as introduced above, injecting the EGR in this way may increase EGR flow capability. Specifically, when boost or intake manifold pressure is greater than turbine backpressure, the lower pressure at the EGR injection site may result in increased EGR flow over traditional HP EGR systems. Further, injecting the EGR in a higher flow area in the diffuser may increase mixing of the EGR exhaust gases and the intake air stream. Further still, injecting the EGR downstream of the compressor blade may increase compressor wheel and blade durability. For example, condensation in the EGR stream may not contact the compressor wheel, thereby reducing corrosion and compressor wheel damage. Additionally, injecting higher temperature EGR exhaust gases after the compressor wheel may help to maintain the compressor wheel at a lower temperature, thereby further increasing compressor wheel durability.

In this way, exhaust gases from an exhaust gas recirculation (EGR) system may be introduced into an intake passage at a compressor. Specifically, the EGR exhaust gases may flow through an EGR inlet volute incorporated into a casting of the compressor. The EGR inlet volute may inject the exhaust gases into a diffuser, proximate to a trailing edge of a compressor blade of a compressor wheel. Thus, the EGR gases may enter the diffuser downstream of the compressor wheel at an area of relatively higher air flow velocities and lower air pressures than further downstream in the diffuser and compressor volute. Coupling an EGR passage to the intake system in this way may increase compressor blade durability and increase an EGR flow range. Further, compressor mass air flow may increase by compressing cooler air.

As one embodiment, a compressor of a turbocharger comprises a compressor wheel rotatable about a central axis of the compressor and an exhaust gas recirculation inlet volute, the exhaust gas recirculation inlet volute having an injection port positioned proximate to a trailing edge of the compressor wheel. The compressor further comprises a volute positioned within a casting of the compressor, the volute including a diffuser. The injection port is a curved slot between the exhaust gas recirculation inlet volute and the diffuser, and downstream of the trailing edge.

In one example, the exhaust gas recirculation inlet volute is positioned within the casting of the compressor. A diameter of the volute increases from a first end of the volute to a second end of the volute, the first end positioned at the casting and the second end positioned at an outlet of the volute. Conversely, a diameter of the exhaust gas recirculation inlet volute decreases from a first end of the exhaust gas recirculation inlet volute to a second end of the exhaust gas recirculation inlet volute, the first end positioned at an inlet of the exhaust gas recirculation inlet volute and the second end positioned at the casting. The compressor further includes an inlet conduit, the inlet conduit centered along the central axis of the compressor. A central axis of the volute curves around the inlet conduit along an outer circumference of the compressor while a central axis of the exhaust gas recirculation inlet volute curves around the inlet conduit at an inside edge of the volute. Further, the central axis of the exhaust gas recirculation inlet volute at an inlet end of the exhaust gas recirculation inlet volute is parallel to the central axis of the volute at an outlet end of the volute. Additionally, the central axis of the exhaust gas recirculation inlet volute and the central axis of the volute are perpendicular to the central axis of the compressor. In an alternate example, the exhaust gas recirculation inlet volute is positioned within a backplate of the compressor.

As another embodiment, a compressor of a turbocharger comprises a compressor casting including a volute, the volute coupled to a diffuser; a compressor wheel rotatable about a central axis of the compressor, the compressor wheel including a compressor blade; and an exhaust gas recirculation inlet volute positioned within the compressor casting, the exhaust gas recirculation inlet volute having an injection port coupled to the diffuser downstream of a trailing edge of the compressor blade but upstream of an end of the diffuser proximate to the volute. The exhaust gas recirculation inlet volute is a circular passage with a passage diameter and a central axis, the central axis of the exhaust gas recirculation inlet volute curving around an inlet conduit of the compressor. Further, the exhaust gas recirculation inlet volute is nested between the volute and the inlet conduit within the casting, the volute curving around the inlet conduit with a greater radius of curvature than the exhaust gas recirculation inlet conduit, the radius of curvature of the volute defined between the central axis of the compressor and a central axis of the volute, and wherein the volute and the exhaust gas recirculation inlet volute have oppositely increasing cross-sectional areas in one direction around the central axis of the compressor.

The passage diameter of the exhaust gas recirculation inlet volute decreases from an inlet end of the exhaust gas recirculation inlet volute to a second end of the exhaust gas recirculation inlet volute, the second end positioned at the compressor casting. Further, the central axis of the exhaust gas recirculation inlet volute is parallel to a central axis of the volute at an inlet end of the exhaust gas recirculation inlet volute and an outlet end of the volute. Additionally, the central axis of the exhaust gas recirculation inlet volute is perpendicular to the central axis of the compressor. The injection port is a curved slot extending around a circumference of the compressor wheel, the curved slot curving in an air flow direction.

One embodiment includes an engine system, comprising: an engine with an intake passage and an exhaust passage; a compressor positioned in the intake passage, the compressor having an exhaust gas recirculation inlet volute, the exhaust gas recirculation inlet volute having an injection port positioned downstream of a trailing edge of a compressor blade of the compressor; a turbine positioned in the exhaust passage, the turbine driving the compressor; and an exhaust gas recirculation system having an exhaust gas recirculation passage, the exhaust gas recirculation passage coupled between the exhaust passage, upstream of the turbine, and the exhaust gas recirculation inlet volute of the compressor. The compressor may further include a volute having a diffuser and wherein the injection port of the exhaust gas recirculation inlet volute is coupled to the diffuser downstream of the trailing edge of the compressor blade.

An embodiment may include a control method for the engine system, the method including delivering high or low-pressure exhaust gas recirculation flow into a volute of a compressor separate from an intake air volute of the compressor, the volute delivering the EGR downstream of a trailing edge of a compressor blade. An engine control system, such as shown in FIG. 1, may adjust an amount of EGR flow delivered downstream of the trailing edge in response to engine operating conditions. In one example, the amount of EGR flow may be increased in response to an increase in pressure downstream of the compressor.

Another embodiment may include a method including delivering exhaust gas recirculation (EGR) to an EGR inlet volute of a compressor in an engine intake, the EGR inlet volute separated from another intake volute and having an injection port positioned downstream of a trailing edge of a compressor blade of the compressor. The method may further include driving the compressor with a turbine positioned in an engine exhaust, wherein the EGR is delivered by an EGR system having an exhaust gas recirculation passage coupled between the exhaust, upstream of the turbine, and the EGR inlet volute of the compressor, and wherein the another intake volute has a diffuser, the injection port of the EGR inlet volute being coupled to the diffuser downstream of the trailing edge of the compressor blade.

Note that the example control and estimation methods included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A compressor of a turbocharger, comprising:
 a compressor wheel rotatable about a central rotational axis of the compressor;
 a volute positioned within a casting of the compressor and including a diffuser; and
 an exhaust gas recirculation inlet volute positioned within a backplate of the compressor, the exhaust gas recirculation inlet volute having an injection port coupled to the diffuser downstream of a trailing edge of the compressor wheel, where both the volute and the exhaust gas recirculation inlet volute are circular passages with a circular cross-section area and a passage diameter that change along a length of each volute as each volute wraps around the central rotational axis of the compressor, where the exhaust gas recirculation inlet volute is positioned on an opposite side of the diffuser from the volute, where the injection port is a curved slot between the exhaust gas recirculation inlet volute and the diffuser, and downstream of the trailing edge, where the curved slot curves from the exhaust gas recirculation inlet volute to the diffuser in an airflow direction, the curved slot extending around a circumference of the compressor wheel, and where the curved slot curves outward from a main passageway of the exhaust gas recirculation inlet volute, in a direction relative to the central rotational axis.

2. The compressor of claim 1, wherein the exhaust gas recirculation inlet volute winds around a circumference of the backplate.

3. The compressor of claim 2, wherein the passage diameter of the volute increases from a first end of the volute to a second end of the volute, the first end positioned at the casting and the second end positioned at an outlet of the volute.

4. The compressor of claim 2, wherein the passage diameter of the exhaust gas recirculation inlet volute decreases from a first end of the exhaust gas recirculation inlet volute to a second end of the exhaust gas recirculation inlet volute, the first end positioned at an inlet of the exhaust gas recirculation inlet volute and the second end positioned at the backplate, wherein the exhaust gas recirculation inlet volute has a central axis centered within the circular passage of the exhaust gas recirculation inlet volute, and wherein the inlet of the exhaust gas recirculation inlet volute shares the central axis with the circular passage of the exhaust gas recirculation inlet volute, where the central axis has a curvature as it wraps around the compressor.

5. The compressor of claim 1, wherein the compressor further includes an inlet conduit, the inlet conduit centered along the central rotational axis of the compressor.

6. The compressor of claim 5, wherein a central axis of the volute curves around the inlet conduit along an outer circumference of the compressor.

7. The compressor of claim 6, wherein a central axis of the exhaust gas recirculation inlet volute curves around a circumference of the backplate and wherein a ring radius of the exhaust gas recirculation inlet volute, the ring radius of the exhaust gas recirculation inlet volute defined between the central rotational axis of the compressor and the central axis of the exhaust gas recirculation inlet volute, is smaller than a ring radius of the volute, the ring radius of the volute defined between the central rotational axis of the compressor and the central axis of the volute.

8. The compressor of claim 7, wherein the central axis of the exhaust gas recirculation inlet volute at an inlet end of the exhaust gas recirculation inlet volute is parallel to the central axis of the volute at an outlet end of the volute.

9. The compressor of claim 7, wherein the central axis of the exhaust gas recirculation inlet volute and the central axis of the volute are perpendicular to the central rotational axis of the compressor.

10. A compressor of a turbocharger, comprising:
a compressor casting including a volute, the volute coupled to a diffuser;
a compressor wheel rotatable about a central axis of the compressor, the compressor wheel including a compressor blade; and
an exhaust gas recirculation inlet volute positioned within the compressor casting on a same side of the diffuser as the volute, the exhaust gas recirculation inlet volute having an injection port coupled to the diffuser downstream of a trailing edge of the compressor blade but upstream of an end of the diffuser proximate to the volute, where an outer edge of the exhaust gas recirculation inlet volute that faces opposite the injection port is positioned further inboard than an outer edge of the volute that faces opposite the diffuser, relative to a center of the turbocharger, where the center is positioned between the compressor and a turbine of the turbocharger;
wherein the exhaust gas recirculation inlet volute is a circular passage with a circular cross-section area, a passage diameter, and a central axis, the central axis of the exhaust gas recirculation inlet volute curving around an inlet conduit of the compressor at an inside edge of the volute.

11. The compressor of claim 10, wherein the exhaust gas recirculation inlet volute is nested between the volute and the inlet conduit within the casting, the volute curving around the inlet conduit with a greater radius of curvature than the exhaust gas recirculation inlet volute, the radius of curvature of the volute defined between the central axis of the compressor and a central axis of the volute, and wherein the volute and the exhaust gas recirculation inlet volute have oppositely increasing cross-sectional areas in one direction around the central axis of the compressor.

12. The compressor of claim 10, wherein the passage diameter decreases from an inlet end of the exhaust gas recirculation inlet volute to a second end of the exhaust gas recirculation inlet volute, the second end positioned at the compressor casting.

13. The compressor of claim 10, wherein the central axis of the exhaust gas recirculation inlet volute is parallel to a central axis of the volute at an inlet end of the exhaust gas recirculation inlet volute and an outlet end of the volute, and wherein the central axis of the exhaust gas recirculation inlet volute is perpendicular to the central axis of the compressor.

14. The compressor of claim 10, wherein the injection port is a curved slot extending around a circumference of the compressor wheel, the curved slot curving in an air flow direction, and where the curved slot curves outward from a main passageway of the exhaust gas recirculation inlet volute, in a direction relative to the central axis of the compressor.

15. The compressor of claim 10, wherein the exhaust gas recirculation inlet volute forms a narrower region of the compressor casting than the volute, in a direction of the central axis of the compressor.

16. A method, comprising:
delivering exhaust gas recirculation (EGR) to an EGR inlet volute arranged in a backplate of a compressor in an engine intake, the EGR inlet volute separated from an intake volute positioned in a casting of the compressor, the intake volute having a diffuser, the EGR inlet volute having an injection port coupled to the diffuser opposite the intake volute and downstream of a trailing edge of a compressor blade of the compressor, where the EGR inlet volute is a circular passage with a circular cross-section area and a diameter that both decrease as the circular passage wraps around a central axis of the compressor from an inlet of the circular passage positioned outside of the backplate to a second end of the circular passage positioned at the backplate, and where the injection port is a curved slot extending around a circumference of the compressor blade, the curved slot curving in an air flow direction, and where the curved slot curves outward from a main passageway of the EGR inlet volute, in a direction relative to the central axis of the compressor.

17. The method of claim 16, further comprising driving the compressor with a turbine positioned in an engine exhaust, wherein the EGR is delivered by an EGR system having an exhaust gas recirculation passage coupled between the exhaust, upstream of the turbine, and the EGR inlet volute of the compressor.

\* \* \* \* \*